(12) United States Patent
Sher et al.

(10) Patent No.: US 6,994,876 B1
(45) Date of Patent: Feb. 7, 2006

(54) IRON FORTIFICATION SYSTEM

(75) Inventors: Alexander Sher, Danbury, CT (US); Mark Randolph Jacobson, New Milford, CT (US); Chandrasekhara Reddy Mallangi, New Milford, CT (US); Dharam Vir Vadehra, New Milford, CT (US); Elaine Regina Wedral, Sherman, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/914,880

(22) PCT Filed: Mar. 1, 2000

(86) PCT No.: PCT/EP00/01743

§ 371 (c)(1),
(2), (4) Date: Apr. 22, 2002

(87) PCT Pub. No.: WO00/51447

PCT Pub. Date: Sep. 8, 2000

Related U.S. Application Data

(60) Provisional application No. 60/122,289, filed on Mar. 1, 1999.

(51) Int. Cl.
*A23L 1/304* (2006.01)
*A23L 2/00* (2006.01)

(52) U.S. Cl. .................... 426/74; 426/52; 426/56; 426/590; 426/593; 426/597

(58) Field of Classification Search ............... 426/74, 426/590, 593, 597, 656, 32, 56, 521, 52
See application file for complete search history.

(56) References Cited

U.S. PATENT DOCUMENTS

| 4,020,158 A | 4/1977 | Ashmead et al. |
| 4,172,072 A | 10/1979 | Ashmead |
| 4,216,144 A | 8/1980 | Ashmead |

FOREIGN PATENT DOCUMENTS

| EP | 0 297 679 A2 | 1/1989 |
| EP | 0 319 664 A1 | 6/1989 |
| GB | 673063 | 6/1952 |
| WO | WO 93/08830 | 5/1993 |
| WO | WO 98/48648 | 11/1998 |

OTHER PUBLICATIONS

Tsuge et al. article entitled "Antioxidative Activity of Peptides Prepared by Enzymatic Hydrolysis of Egg-white Albumin" *Nippon Nogeikagaku Kaishi*, vol. 65, No. 11, pp. 1635-1641, 1991.
Patent Abstracts of JP 63 290827 A—XP002140164.

*Primary Examiner*—Helen Pratt
(74) *Attorney, Agent, or Firm*—Bell, Boyd & Lloyd LLC

(57) ABSTRACT

An iron-protein hydrolysate complex which may be used to fortify foods and beverages with iron. The complex is formed of ferrous ions chelated to partially hydrolyzed egg white protein. The hydrolyzed egg white protein has a molecular weight in the range of about 500 to about 10,000. The complexes are sufficiently stable as to be suitable for use in sterilized products, such as retorted products. Moreover, despite the stability, the iron in the complexes has substantially the same bioavailability as ferrous sulfate.

23 Claims, No Drawings

US 6,994,876 B1

IRON FORTIFICATION SYSTEM

This application claims the benefit of provisional application No. 60/122,289 filed Mar. 1, 1999.

FIELD OF THE INVENTION

This invention relates to an iron fortification system which is based upon hydrolysates of egg white protein and which may be used in foods and beverages. The invention also relates to a method of preparing the system and to fortifying foods and beverages with iron.

BACKGROUND OF THE INVENTION

Iron is an essential trace element in animal and human nutrition. It is a component of heme in hemoglobin and of myoglobin, cytochromes and several enzymes. The main role of iron is its participation in the transport, storage and utilization of oxygen. Inadequate iron is a direct cause of the high incidence of anemia, especially among children, adolescents and women. The need for adequate iron is one which extends for the entire life of the human being.

However the body does not produce iron and is totally dependent on an external supply of iron; nutritional or supplementary. The recommended daily allowance for iron intake is usually about 10 mg per day. However the amount needed is dependent on age and sex. Children, women up to the time of menopause, and expectant and nursing mothers have higher requirements of iron.

Therefore iron deficiency is essentially a nutritional problem; a nutritional problem which is common not only in the developing countries. The problem is readily dealt with by consuming foods which naturally provide adequate iron but this is not always possible in disadvantaged societies. Also, many foods normally consumed in developed countries are poor in iron.

To provide a source of iron, many foods and beverages are supplemented with iron. Usually the iron source used in supplementation is a soluble iron salt such as ferrous sulfate, ferrous lactate, ferrous gluconate, ferrous fumarate, ferric citrate, ferric choline citrate, and ferric ammonim citrate. Ferrous sulfate is especially common due to its good bioavailability. Unfortunately, iron supplementation and especially ferrous sulfate supplementation has deleterious effects. In particular, the iron often causes discoloration and off-flavors due to its capacity to interact with polyphenols and lipids and to promote destructive free-radical reactions. This is especially the case at high temperatures and in the presence of oxygen and light.

For example, the addition of a soluble iron source to chocolate milk powder causes the beverage to turn to dark gray when reconstituted with water or milk. It is believed that this is due to the interaction between the iron and iron sensitive ingredients, such as polyphenols. Further, the addition of soluble iron sources to milk, cereals, other fat containing products, mostly products with high level of unsaturated fatty acids, causes flavor changes due to lipid oxidation. Lipid oxidation not only affects the organoleptic properties of foods and beverages, but also undesirably affects the nutritional quality of these products. These interactions can be also enhanced during heat treatment, such as pasteurization or sterilization. In addition, the pH of some iron salts systems may not be compatible with other ingredients or may affect the flavor. Also, from a technical point of view, soluble iron salts can cause corrosion of processing equipment.

Unfortunately, non-soluble or slightly soluble iron sources such as elemental iron, ferric pyrophosphate, etc., are not sufficiently bioavailable. Therefore, while they may cause little or no discoloration and off-flavor problems, they are poorly absorbed by the body.

To deal with these problems, there have been several attempts to encapsulate or complex soluble iron sources in a way which reduces their reactivity but which maintains their bioavailability. However the attempts have not been entirely successful.

An example of encapsulated iron source is described in U.S. Pat. No. 3,992,555 where iron is coated in an edible, metabolizable fat which has a melting point between about 38° C. and about 121° C. Hydrogenated and refined vegetable oils, and particularly distilled monoglycerides from fully hydrogenated cottonseed oil, are described to be suitable. Although this encapsulation of the iron results in about a 20% reduction in bioavailability, this is stated to be acceptable providing the iron source used has a sufficiently good bioavailability. However, the primary problem is that, if the foods must undergo any form of harsh processing, the capsule is destroyed. Consequently the encapsulated iron cannot be used in products which need to be retorted or subjected to other forms of harsh treatment.

An early example of an iron complex is described in U.S. Pat. No. 505,986. This complex is an iron albumin preparation. The albumin is in intact but heat coagulated form. The complex is recovered as a precipitate. However, when these iron albumin complexes are used in beverages, discoloration and oxidation does occur. For example, chocolate beverages fortified with iron albumin complexes turn a gray color.

More recent examples of iron complexes are described in U.S. Pat. No. 3,969,540 where iron in the ferric form is complexed with hydrolyzed casein or hydrolyzed liver powder. Various other hydrolyzed proteins are also mentioned as possible ligands. The complexes are collected as insoluble precipitates. Unfortunately the iron in the complexes is unlikely to have acceptable bioavailability.

Further examples iron complexes are described in U.S. Pat. No. 4,172,072 where iron is complexed with substantially completely hydrolyzed collagen. Various other completely hydrolyzed proteins are also mentioned as possible ligands. However, the complexes are stated to be stable under acidic conditions and, since the conditions in the gut are acidic, the iron in the complexes is unlikely to have acceptable bioavailability. Also, the complexes are not sufficiently strong to prevent discoloration and lipid oxidation.

Further examples are described in U.S. Pat. No. 4,216,144 where iron in the ferrous form is complexed with hydrolyzed protein; especially soy protein. The bioavailability of the iron in the complexes is claimed to be better than ferrous sulfate. However, when ferrous-soy hydrolysate complexes are used in beverages, discoloration and oxidation does occur. For example, chocolate beverages fortified with ferrous-soy hydrolysate complexes turn a gray color.

Other examples of iron complexes are described in Japanese patent applications 2-083333 and 2-083400. In these applications, ferrous caseinate complexes are used to treat anemia. However, these complexes are not suitable for use in fortifying foods and beverages because they are not sufficiently stable. Also, these complexes are in the form of coagulates and are difficult to disperse.

It is therefore an object of the invention to provide an iron fortification system which is relatively stable but in which the iron is relatively bioavailable.

SUMMARY OF THE INVENTION

Accordingly, in one aspect, this invention provides an iron-protein hydrolysate complex which comprises ferrous ions chelated to partially hydrolyzed egg white protein having a molecular weight in the range of about 500 to about 10,000.

It is surprisingly discovered that complexes formed from iron in the ferrous form and partially hydrolyzed egg white protein are very stable. In fact, the complexes are sufficiently stable as to be suitable for use in retorted products which contain lipids and polyphenols. However, despite the stability, the iron in the complexes has substantially the same bioavailability as ferrous sulfate; which is remarkably good.

Preferably, the partially hydrolyzed egg white protein has a molecular weight in the range of about 2,000 to about 6,000.

In another aspect, this invention provides an iron-protein hydrolysate complex which comprises ferrous ions chelated to egg white protein which is partially hydrolyzed using a microbial protease.

Preferably, the microbial protease is a fungal protease obtained from *Aspergillus oryzae* and contains both endo-peptidase and exo-peptidase.

In a further aspect, this invention provides an iron-protein hydrolysate complex which comprises ferrous ions chelated to partially hydrolyzed egg white protein; the complex containing about 1% to about 2% or about 4.5% to about 10% by dried weight of ferrous ions.

The complexes are preferably stable at neutral pH but disassociate at a pH below about 3.

In a yet further aspect, this invention provides a sterilized liquid beverage which contains lipid and a stable iron fortification system, the iron fortification system comprising an iron-protein hydrolysate complex of ferrous ions chelated to partially hydrolyzed egg white protein. The beverage may be a chocolate containing beverage.

In yet another aspect, this invention provides a sterilized liquid beverage which contains polyphenols and a stable iron fortification system, the iron fortification system comprising an iron-protein hydrolysate complex of ferrous ions chelated to partially hydrolyzed egg white protein. The beverage may be a tea beverage.

The beverages may be sterilized by retorting or ulta high temperature pasteurization.

The invention also provides a beverage powder which contains lipid and a stable iron fortification system, the iron fortification system comprising an iron-protein hydrolysate complex of ferrous ions chelated to partially hydrolyzed egg white protein. The beverage powder may contains chocolate.

In a further aspect, this invention provides a process for preparing an iron fortification system, the process comprising:

enzymatically hydrolyzing, preferably under acidic conditions, an egg white protein using a microbial, preferably an acidic fungal, protease to provide a partially hydrolyzed egg white protein;

adding a ferrous source to the partially hydrolyzed egg white protein under acidic conditions; and raising the pH to 6.5 to 7.5 for forming a ferrous-hydrolyzed egg white protein complex as the iron fortification system.

The partially hydrolyzed egg white protein may be subjected to further hydrolysis steps prior to the addition of the ferrous source. Preferably the fungal protease is obtained from *Aspergillus oryzae* and contains both endo-peptidase and exo-peptidase.

The process may also include the further step of drying the ferrous-hydrolyzed egg white protein complex to a powder form.

DETAILED DESCRIPTION OF THE PREFERRED EMBODIMENTS

Embodiments of the invention are now described by way of example only.

This invention is based upon the discovery that partially hydrolyzed egg white protein is able to strongly complex with ferrous ions and yet provide the iron in a bioavailable form. The resulting iron complexes have reduced ability to cause deleterious effects such as lipid oxidation, color degradation, and vitamin C degradation. This makes the iron complexes an ideal vehicle for fortifying foods and beverages; especially foods and beverages intended to improve nutritional status.

The iron source that may be used in the iron complexes may be any food grade ferrous salt, such as ferrous sulfate, ferrous chloride, ferrous nitrate, ferrous citrate, ferrous lactate, or ferrous fumarate, or mixtures thereof. However, the preferred iron source is ferrous sulfate. The iron source is preferably provided in the form of a ferrous solution.

The iron complexes are prepared by preparing partially hydrolyzed egg white protein, adding the iron source under acidic conditions, and then neutralizing.

The partially hydrolyzed egg white protein should be such that the molecular weight of the protein fractions is in the range of about 500 to about 10000; preferably about 2000 to about 6000. It is found that iron complexes which are prepared from intact egg white protein or extensively hydrolyzed egg white protein are not sufficiently strong. However, iron complexes prepared from partially hydrolyzed egg white protein are extremely stable.

The hydrolysis of the egg white protein may be carried out in one or more steps as is conventional. However, best results are obtained when the hydrolysis procedure includes an enzymatic hydrolysis step using an acid protease in an acidic medium. Suitable acid proteases are commercially available. Particularly suitable acid proteases may be obtained by the controlled fermentation of fungae such as *Aspergillus oryzae*. These proteases contain both endo-peptidases and exo-peptidases. An example of such an acid enzyme is VALIDASE FP-60 (obtainable from Valley Research, Inc., South Bend, Ind.).

The medium may be acidified by using a suitable food grade inorganic or an organic grade acid. Examples of acids which may be used are phosphoric, hydrochloric, sulfuric, lactic, malic, fumaric, gluconic, succinic, ascorbic, or citric. The most preferred acid is phosphoric acid. The pH may be selected to provide for optimum performance of the enzyme. The pH selected may be that at which the enzyme performs optimally. This information may be obtained from the supplier or by simple trial.

The hydrolyzed protein obtained after hydrolysis with the acid protease may be used in this form. However, the hydrolyzed protein may be further hydrolyzed if desired. For any further enzymatic hydrolysis steps which may be desired, any suitable enzyme may be used. Examples include but are not limited to ALCALASE, FLAVORZYME and NEUTRASE, (Novo Nordisk A/S, Novo Alle, Denmark), and PROZYME and PANCREATIN (Amano International Enzyme Co., Inc., Troy, Va.). The enzymes may be acidic proteases, alkaline proteases or neutral proteases.

Particularly suitable are alkaline proteases.

Prior to adding the iron source to the partially hydrolyzed egg white protein, the partially hydrolyzed egg white protein should be at an acidic pH of about 3.0 to about 5.5. If necessary, the pH may be adjusted by adding a suitable food grade inorganic or an organic grade acid as defined above. The most preferred acid is phosphoric acid.

The ferrous solution and the partially hydrolyzed egg white protein are then combined. This is preferably carried out under agitation with the ferrous solution added to the partially hydrolyzed egg white protein; preferably slowly. The amount of the ferrous solution which is added may be selected to provide the desired ferrous loading. However, it is surprisingly found that the binding of the ferrous in the complex is related to the amount of ferrous bound. Optimum binding is obtained when the complex contains about 1% to about 2% or about 4.5% to about 10% by dried weight of iron. Of course, ferrous loads of more than 10% may be used but the binding, and hence the stability of the complex, may be slightly less.

After adding the iron source to the partially hydrolyzed egg white protein, the solution should be neutralized to promote the formation of a ferrous complex. However, the mixture should not be allowed to become basic to avoid precipitation and the formation of hydroxide ions. A pH in the range of about 6.5 to about 7.5 is recommended.

If necessary, an alkali may be added to neutralize the pH of the mixture. Any food grade alkali may be used for neutralization, including but not limited to sodium hydroxide, potassium hydroxide, ammonia hydroxide, magnesium hydroxide, sodium carbonate, sodium bicarbonate, potassium carbonate, and potassium bicarbonate. Ammonia hydroxide is preferred.

All steps are preferably carried out under agitation.

The complexes obtained may be used in liquid form as obtained. More preferably however, the complexes are dried to powder. The drying may be freeze drying or may be spray drying. Any suitable procedure for spray- or freeze-drying the complexes to powder may be used. Suitable procedures are known in the art.

In use, the complexes are included in the ingredients making up the desired foods or beverage and the ingredients processed in the normal way. Although the bioavailability of the iron may be slightly less than that of ferrous sulfate, it is found that it is well within acceptable limits. In most cases, the statistical difference in bioavailability is not significant. Further, it is found that the complexes are very stable and when used in foods and beverages, do not lead to increased discoloration or off-flavor generation. Moreover, it is found that the complexes do not increase processing problems such as fouling.

The complexes are particularly suitable for use in foods or beverages in liquid form; for example infant formula concentrates and ready-to-drink beverages such as chocolate and malted milk drinks. These foods or beverages usually undergo retorting or other sterilization as part of their processing and hence the ability of the complexes to withstand harsh treatment provides a great improvement. However, the complexes may be used in other types of foods or beverages such as powdered beverages, infant formulas, and infant cereals.

The complexes may also be included in pet foods which usually contain lipids and vitamins.

Products which contain the complexes are perceived to have similar organoleptic properties and color as compared to unfortified products. This offers the advantage that products may be fortified without causing noticeable changes which may adversely affect consumer perception. Also, it is found that vitamin C is not degraded by the complexes. Hence the complexes may be used in products which are intended to be nutritionally balanced.

Specific examples of the invention are now described to further illustrate the invention.

EXAMPLE 1

An amount of 1000 g of frozen egg white is added to a fermentor (Biostat® M) and allowed to thaw at room temperature. The pH is slowly adjusted to 3.0 using 85% $H_3PO_4$ under agitation. The solution is then heated to 42° C. An amount of 2.5 g of an acid protease (VALIDASE FP60 obtained from Valley Research, Inc or South Bend, Ind.) is added and the solution allowed to react for 16 hours under low/medium agitation at a pH of 3.0 to 3.3. This acid protease is obtained from *Aspergillus oryzae* and contains both endo-peptidase and exo-peptidase.

After 16 hours of reaction, ammonium hydroxide (28%) is added to raise the pH to 7.4. An amount of 2.5 g of alkaline protease (ALCALASE 2.4 L, obtained from Novo Nordisk A7S) is added and the temperature of the solution is raised to 50° C. under agitation. This protease is obtained from a strain of *Bacillus licheniformis* and contains mainly endo-proteinase. After 3 hours of reaction under low/medium agitation, the solution is cooled to room temperature. An amount of 43.5 g of 85% $H_3PO_4$ is added followed by an amount of 5.0 g of $FeSO_4.7H_2O$ in 50 ml of $H_2O$, both under agitation. The pH is then adjusted to 6.7 with 28% $NH_4OH$ under agitation. The solution is then heated to a temperature of 90° C. for 10 minutes. The solution is then cooled to room temperature.

The liquid iron complex is collected.

EXAMPLE 2

The process of example 1 is repeated. Then an amount of 90 g of maltodextrin M.D. 5 is added to the liquid iron complex under agitation. The mixture is then spray dried using an atomizing spinning disk spray-drier ($T_{in}$145° C., $T_{out}$=80° C.).

The powdered iron complex is collected.

EXAMPLE 3

An amount of 1000 g of frozen egg white is added to a fermentor (Biostat® M) and allowed to thaw at room temperature. The pH is slowly adjusted to 3.0 using 85% $H_3PO_4$ under agitation. The solution is then heated to 42° C. An amount of 2.5 g of an acid protease (VALIDASE FP60 obtained from Valley Research, Inc or South Bend, Ind.) is added and the solution allowed to react for 4 hours under low/medium agitation at a pH of 3.0 to 3.3.

After reaction, the solution is cooled to room temperature. An amount of 5.0 g of $FeSO_4.7H_2O$ in 50 ml of $H_2O$ is added under agitation. The pH is then adjusted to 6.7 with 28% $NH_4OH$ under agitation. The solution is then heated to a temperature of 60° C. for 10 minutes. The solution is then cooled to room temperature.

An amount of 90 g of maltodextrin M.D. 5 is added to the solution under agitation. The mixture is then spray dried using an atomizing spinning disk spray-drier ($T_{in}$=145° C., $T_{out}$=80° C.).

The powdered iron complex is collected.

EXAMPLE 4

The process of example 1 is repeated except that the egg white is subjected to hydrolysis for 6 hours. The powdered iron complex is collected.

EXAMPLE 5

Four chocolate milk beverages are prepared by reconstituting a chocolate milk powder (QUIK, Nestlé USA, Inc) to a concentration of 8.5% by weight. Each beverage contains 12.5 ppm of added iron in the form of a different iron complex of one of examples 1 to 4.

The beverages are placed into sealed 125 ml glass jars and autoclaved at about 121° C. (250° F.) for 5 minutes. The jars are cooled to room temperature and stored for 6 months.

The beverages are evaluated for physical stability, color and taste after 1, 2, 3, 4, 5 and 6 months. Taste is judged by a taste panel of 10 people. All beverages are judged to be without discoloration, sedimentation or coagulation and of a good flavor.

EXAMPLE 6

Four chocolate milk beverages are prepared by reconstituting a chocolate milk powder (QUIK, Nestlé USA, Inc) to a concentration of 8.5% by weight. Each beverage contains 12.5 ppm of added iron in the form of a different iron complex of one of examples 1 to 4.

The beverages are pre-heated to about 80° C. (175° F.), heated to about 140° C. (285° F.) by steam injection, held at this temperature for 5 seconds, and cooled to about 80° C. (175° F.). The beverages are then homogenized at about 17/3.5 MPa (2500/500 psi), cooled to about 16° C. (60° F.) and filled in 250 ml Tetra Brik Aseptic® packages (Tetra Pak Inc., Chicago Ill.).

The beverages are evaluated for physical stability, color and taste after 1 day, 2 weeks, and 1 and 2 months. Taste is judged by a taste panel of 10 people. All beverages are judged to be without discoloration, sedimentation or coagulation and of a good flavor.

EXAMPLE 7

Four chocolate milk beverages are prepared by reconstituting a chocolate milk powder (QUIK, Nestlé USA, Inc) to a concentration of 8.5% by weight. Each beverage contains 12.5 ppm of added iron in the form of a different iron complex of one of examples 1 to 4.

The beverages are pre-heated to about 80° C. (175° F.), heated to about 148° C. (298° F.) by steam injection, held at this temperature for 5 seconds, and cooled to about 80° C. (175° F.). The beverages are then homogenized at about 17/3.5 MPa (2500/500 psi), cooled to about 16° C. (60° F.) and filled in 250 ml Tetra Brik Aseptic® packages (Tetra Pak Inc., Chicago Ill.).

The beverages are evaluated for physical stability, color and taste after 1, 2, 3, 4, 5 and 6 months. Taste is judged by a taste panel of 10 people. All beverages are judged to be without discoloration, sedimentation or coagulation and of a good flavor.

EXAMPLE 8

Six beverages are prepared; 3 by reconstituting a chocolate milk powder (QUIK, Nestlé USA, Inc) and 3 by reconstituting a malted powder (MILO, Nestlé Australia Ltd). Each beverage comprises 22.0 g of powder in 180 ml of boiling water. An iron complex of each of examples 2 to 4 is added to both a chocolate beverage and a malted beverage. The final iron concentrations in the chocolate beverages are 15.0 ppm and in the malted beverages are 25.0 ppm.

The beverage are stirred briefly and allowed to stand for 15 minutes at room temperature. After 15 minutes, beverages are judged by a taste panel of 10 people. No color change or off flavors are found when samples are compared to control samples without added iron.

EXAMPLE 9

Three infant cereal meals are prepared by reconstituting 55 g of banana containing infant cereal (Nestlé USA, Inc) with 180 ml of boiling water. Iron complexes of examples 2 to 4 added to each cereal to provide 7.5 mg of iron per 100 g of cereal powder.

Each cereal meal is stirred briefly and allowed to stand for 15 minutes at room temperature. After 15 minutes, the cereal meals are judged by a taste panel of 10 people. No color change or off flavors are found when samples are compared to control samples without added iron.

EXAMPLE 10

The bioavailabilities of the complexes are determined as follows:—

Animals:—The animals used are weanling male Sprague-Dawley rats aged 3 weeks (IFFA-CREDO, L'Arbresle, France).

Diets:—The control diet is an ICN Low-Iron diet (Soccochim SA, Lausanne, Switzerland) which has an iron content of 3 mg/kg. This diet is casein based and provides for the nutritional requirements of growing rats except for iron.

The experimental diets are:—

Diet A:—The control diet supplemented with $FeSO_4 \cdot 7H_2O$ to provide 10 mg/kg iron.

Diet B:—The control diet supplemented with $FeSO_4 \cdot 7H_2O$ to provide 20 mg/kg iron.

Diet 1:—The control diet supplemented with the complex of example 4 to provide 10 mg/kg iron.

Diet 2:—The control diet supplemented with the complex of example 4 to provide 20 mg/kg iron.

Diet 3:—The control diet supplemented with 10 mg/kg of the complex of example 2 to provide 10 mg/kg iron.

Diet 4:—The control diet supplemented with 20 mg/kg of the complex of example 2 to provide 20 mg/kg iron.

Analytical Methods

1) Hemoglobin analysis is performed by anaesthetizing the rats with isoflurane and then drawing a sample of 200 µL of blood from the orbital venous plexus. Blood hemoglobin level in the sample is determined by the cyanmethemoglobin method (Hb kit MPR 3, Boehringer Mannheim GmbH, Germany), using an automated instrument (Hemocue, Baumann-Medical SA, Wetzikon, Switzerland). Commercial quality control blood samples (Dia-HT Kontrollblut, Dia MED, Cressier, Switzerland) having a range of hemoglobin levels are measured with all hemoglobin determinations.

2) Fe-bioavailability as compared to ferrous sulfate heptahydrate is evaluated using a slope-ratio calculation based upon hemoglobin levels. A multiple regression equation relates amounts of iron added to the hemoglobin levels. The equation provides one straight line per diet which intercepts at zero dose. The bioavailability of the iron source relative to ferrous sulfate heptahydrate is then calculated as the ratio of the two slopes. The ratio is multiplied by 100 to provide the relative bioavailability value.

Procedure:—Rats are housed individually in polycarbonate cages, fitted with stainless steel grids. The animals are allowed free access to distilled water. To render the rats anemic, the rats have ad libitum access to the control diet for 24 days. Fresh diet is supplied daily. Spoiling of diet by rats is reduced by covering the diet with a grid.

After 24 days, hemoglobin and weight is determined. Seventy rats with hemoglobin levels between 4.5 and 5.8 mg/dl are randomized into 7 groups of 10 having approximately equal mean hemoglobin and body weight. Each group of animals is fed one of the experimental diets for 14 days. The rats are fed the diets ad libitum beginning with 20 g/day at day 0. The rats have free access to distilled water. Individual food consumption is measured daily. After 14 days, the rats are weighed and hemoglobin is determined.

Results

Mean food consumption and iron intake is not affected by the type of iron source. However the rats receiving no added iron ate less than those receiving iron. The rats consuming diets with 20 mg/kg of added iron consume slightly more than those receiving diets with 10 mg/kg iron.

Weight increase of the rats is not affected by the type of iron source. However, the rats receiving no added iron gained less weight than those receiving iron. The rats receiving diets with 20 mg/kg iron gain slightly more weight than those receiving the diets with 10 mg/kg iron.

The blood hemoglobin levels at the start and at the end of the period are shown in the table below.

| | | Mean hemoglobin values; (Standard Deviation) | | |
|---|---|---|---|---|
| Diet | Added Fe (mg/kg) | Initial hemoglobin (g/dl) | Final hemoglobin (g/dl) | Difference (g/dl) |
| Control | 0 | 5.12 (0.42) | 4.88 (0.43) | −0.24 (0.20) |
| A | 10 | 5.12 (0.41) | 8.66 (0.81) | 3.54 (0.65) |
| B | 20 | 5.12 (0.40) | 11.53 (0.86) | 6.41 (0.82) |
| 1 | 10 | 5.12 (0.40) | 7.90 (0.54) | 2.78 (0.41) |
| 2 | 20 | 5.13 (0.39) | 11.15 (0.57) | 5.92 (0.54) |
| 3 | 10 | 5.13 (0.37) | 8.36 (0.47) | 3.23 (0.34) |
| 4 | 20 | 5.12 (0.38) | 11.51 (0.79) | 6.39 (0.65) |

The relative bioavailabilities are as follows:—

| Diet | Relative Bioavailability |
|---|---|
| 1, 2 | 90 |
| 3, 4 | 98 |
| A, B | 100 |

The bioavailabilities of all of the Fe-protein complexes are similar to that of ferrous sulfate. A relative bioavailability value of less than 91% is taken to be significantly less than the reference. Therefore, from a statistical point of view, the relative bioavailability values of the iron complexes of example 2 are similar to that of ferrous sulfate. However, from a practical viewpoint, all of the complexes have very good bioavailability.

We claim:

1. An iron-protein hydrolysate complex which comprises ferrous ions chelated to partially hydrolyzed egg white protein having a molecular weight in the range of about 2,000 to about 6,000.

2. A complex according to claim 1 in which the partially hydrolyzed egg white protein is microbial protease hydrolysate.

3. A complex according to claim 2 in which the microbial protease is obtained from *Aspergillus oryzae* and contains both endo-peptidase and exo-peptidase.

4. A complex according to claim 1 in which partially hydrolyzed egg white protein is a microbial protease hydrolysate obtained by hydrolyzing egg white protein with a protease obtained from *Aseprgillus oryzae* and containing both endo-peptidase and exo-peptidase, and a protease obtained from *Bacillus licheniformis* and containing endo-proteinase.

5. A complex according to claim 1 which contains about 4.5% to about 10% by dried weight of ferrous irons.

6. A complex according to claim 1 which is stable at neutral pH but disassociates at a pH below about 3.

7. An iron-protein hydrolysate complex which comprises ferrous ions chelated to partially hydrolyzed egg white protein which is a microbial protease hydrolyzate; the microbial protease contains both endo-peptidase and exo-peptidase, the partially hydrolyzed egg white protein has a molecular weight in the range of about 2,000 to about 6,000.

8. A complex according to claim 7 which contains about 4.5% to about 10% by dried weight of ferrous ions.

9. A complex according to claim 7 which is stable at neutral pH but disassociates at a pH below about 3.

10. An iron-protein hydrolysate complex which comprises ferrous ions chelated to partially hydrolyzed egg white protein; the complex containing about 1% to about 10% by dried weight of ferrous ions, the partially hydrolyzed egg white protein has a molecular weight in the range of about 2,000 to about 6,000.

11. A complex according to claim 10 in which the partially hydrolyzed egg white protein is microbial protease hydrolysate.

12. A complex according to claim 10 in which the fungal protease contains both endo-peptidase and exo-peptidase.

13. A complex according to claim 10 which is stable at neutral pH but disassociates at a pH below about 3.

14. A sterilized liquid beverage which contains lipid and a stable iron fortification system, the iron fortification system comprising an iron-protein hydrolysate complex of ferrous ions chelated to partially hydrolyzed egg white protein, the partially hydrolyzed egg white protein has a molecular weight in the range of about 2,000 to about 6,000.

15. A sterilized liquid beverage which contains polyphenols and a stable iron foritification system, the iron fortification system comprising an iron-protein hydrolysate complex of ferrous ions chelated to partially hydrolyzed egg white protein, the partially hydrolyzed egg white protein has a molecular weight in the range of about 2,000 to about 6,000.

16. A beverage powder which contains lipid and a stable iron fortification system, the iron fortification system comprising an iron protein hydrolysate complex of ferrous ions chelated to partially hydrolyzed egg white protein.

17. A process for preparing an iron fortification system, the process comprising:
enzymatically hydrolyzing an egg white protein using a microbial protease to provide a partially hydrolyzed egg white protein;
adding a ferrous source to the partially hydrolyzed egg white protein under acidic conditions; and
raising the pH to 6.5 to 7.5 for forming a ferrous-hydrolyzed egg white protein complex as the iron fortification system, the partially hydrolyzed egg white protein has a molecular weight in the range of about 2,000 to about 6,000.

18. A complex according to claim 1 which contains about 1% to about 2% by dried weight of ferrous ions.

19. A complex according to claim 7 which contains about 1% to about 2% by dried weight of ferrous ions.

20. A complex according to claim 10 which contains about 4.5% to about 10% by dried weight of ferrous ions.

21. A sterilized liquid beverage which contains lipid and a stable iron fortification system, the iron fortification system comprising an iron-protein hydrolysate complex of ferrous ions chelated to partially hydrolyzed egg white protein, the partially hydrolyzed egg white protein has a molecular weight in the range of about 2,000 to about 6,000 wherein the sterilized liquid beverage is a chocolate containing beverage.

22. A sterilized liquid beverage which contains polyphenols and a stable iron foritification system, the iron fortification system comprising an iron-protein hydrolysate complex of ferrous ions chelated to partially hydrolyzed egg white protein, the partially hydrolyzed egg white protein has a molecular weight in the range of about 2,000 to about 6,000 wherein the sterilized liquid beverage is a tea beverage.

23. A beverage powder which contains lipid and a stable iron fortification system, the iron fortification system comprising an iron protein hydrolysate complex of ferrous ions chelated to partially hydrolyzed egg white protein wherein the beverage powder contains cocoa.

* * * * *